(12) United States Patent
Gladden

(10) Patent No.: US 6,418,723 B1
(45) Date of Patent: Jul. 16, 2002

(54) LOW PRESSURE GASEOUS FUEL SYSTEM

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/666,818

(22) Filed: Sep. 21, 2000

(51) Int. Cl.[7] ............................................... F02B 33/44
(52) U.S. Cl. ........................... 60/612; 60/562; 60/737; 60/743; 60/748; 415/142; 415/209.1; 415/120; 415/210; 415/198 A
(58) Field of Search ....................... 60/612, 743, 737, 60/748; 123/562; 415/142, 209.1, 120, 210; 416/198 A

(56) References Cited

U.S. PATENT DOCUMENTS

| | | | | |
|---|---|---|---|---|
| 1,213,889 A | * | 1/1917 | Lawaczeck | 415/120 |
| 1,998,778 A | * | 4/1935 | Gregg | 123/562 |
| 2,092,565 A | * | 9/1937 | Waseige | 123/562 |
| 2,189,106 A | * | 2/1940 | Garve et al. | 60/612 |
| 3,208,213 A | * | 9/1965 | Anderson | 60/612 |
| 4,082,477 A | * | 4/1978 | Kronogard | 415/120 |
| 4,231,225 A | * | 11/1980 | Aya | 60/612 |
| 4,645,419 A | * | 2/1987 | Furuya et al. | 415/210 |
| 4,989,406 A | * | 2/1991 | Vdoviak et al. | 415/142 |
| 5,329,757 A | | 7/1994 | Faulkner et al. | 60/39.02 |

* cited by examiner

Primary Examiner—Thomas Denion
Assistant Examiner—Thai Ba Trieu
(74) Attorney, Agent, or Firm—Todd T. Taylor

(57) ABSTRACT

A low pressure fuel system for a gaseous fuel internal combustion engine in which the source of gaseous fuel is at a pressure lower than the intake manifold pressure of the internal combustion engine. The gaseous fuel is inducted into the interstage duct of a multi-compressor combustion air turbocharger associated with the internal combustion engine. The combined flow of air and gaseous fuel is further compressed in the second compressor stage of the turbocharger.

10 Claims, 2 Drawing Sheets

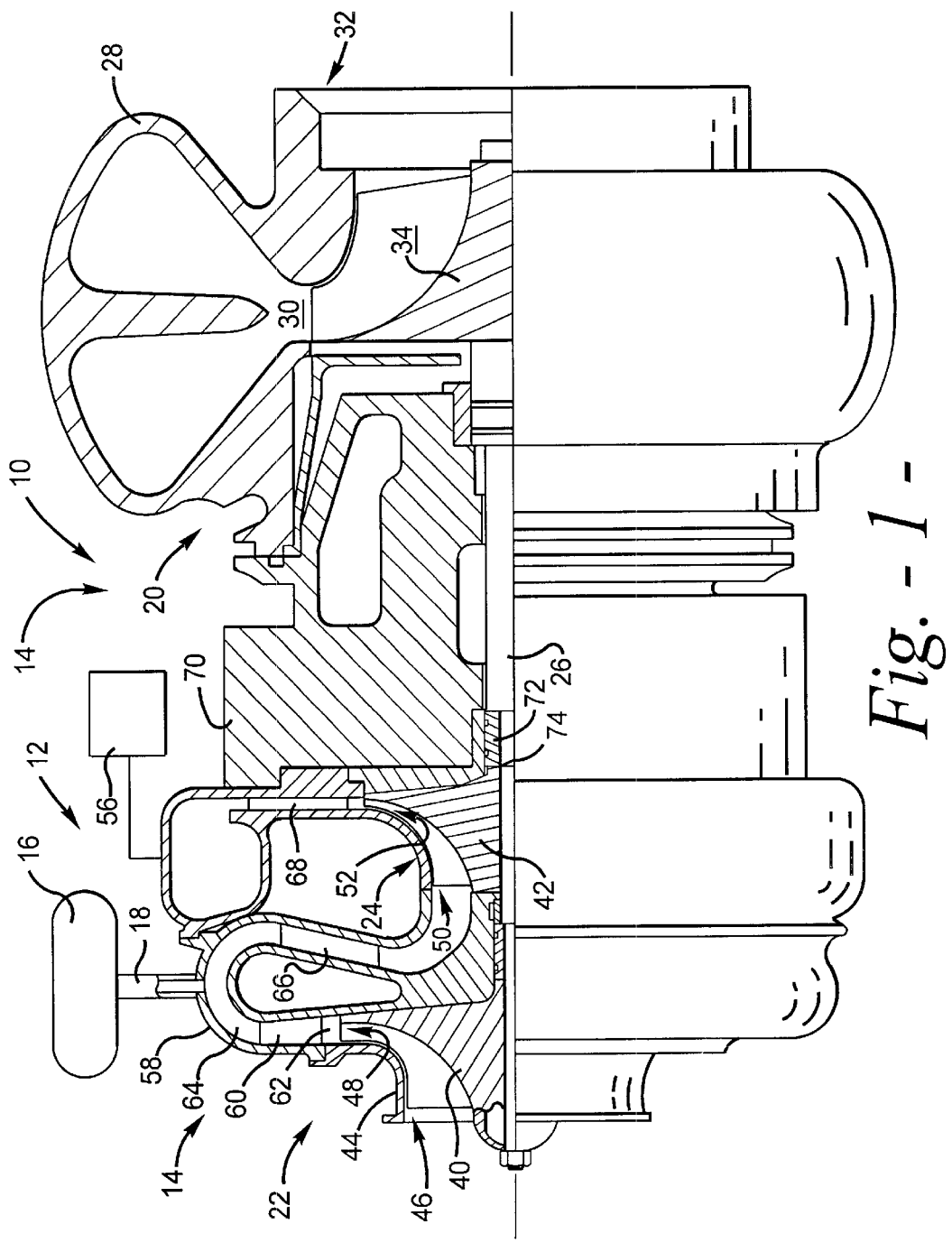
Fig. -1-

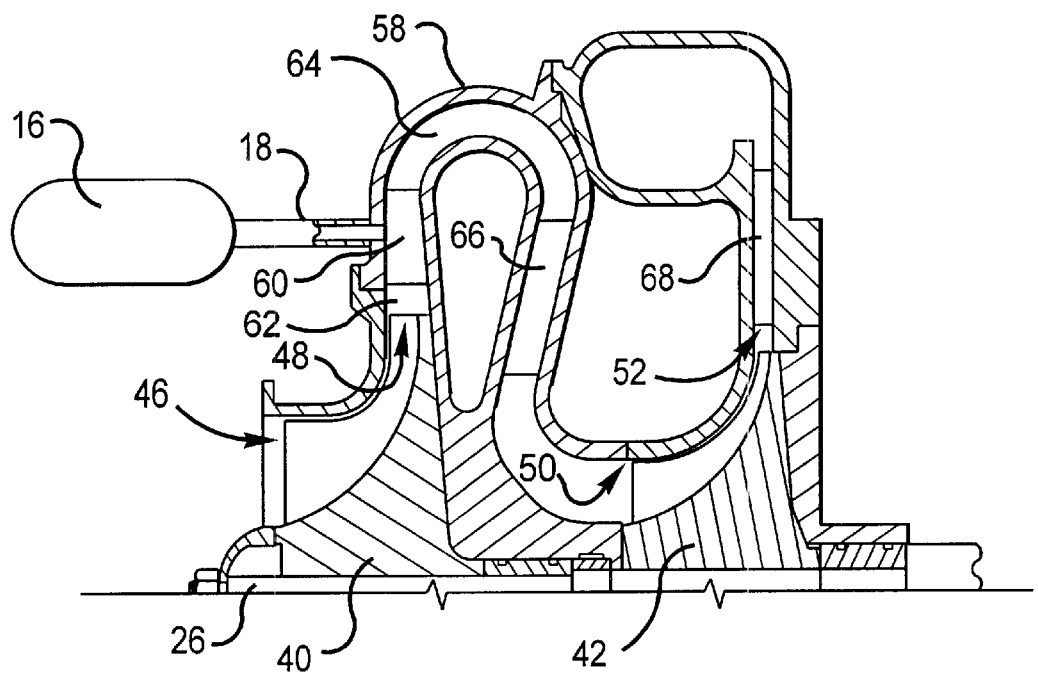
*Fig. - 2 -*
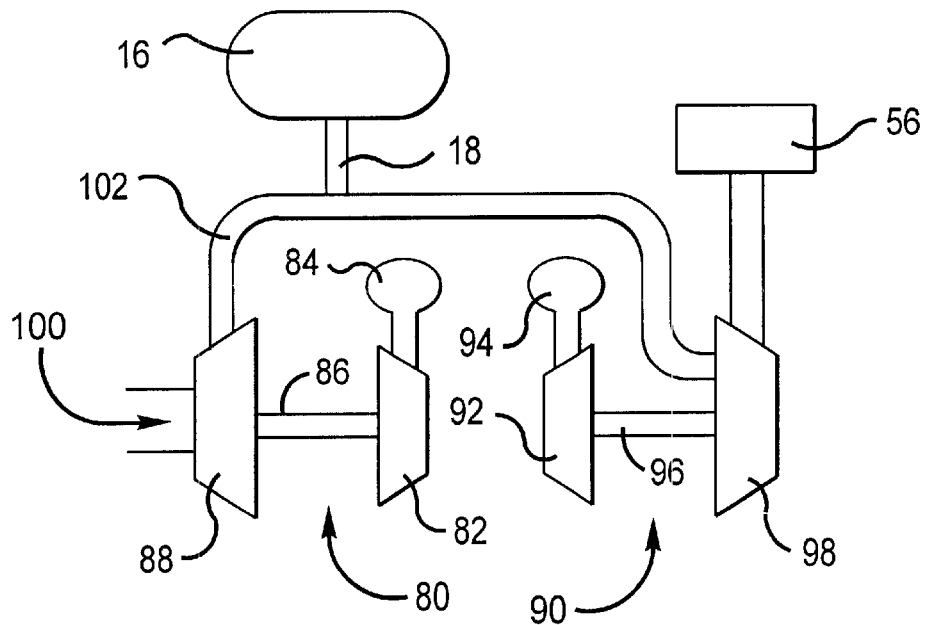
*Fig. - 3 -*

LOW PRESSURE GASEOUS FUEL SYSTEM

TECHNICAL FIELD

The present invention relates to gaseous fuel engines, and more particularly, to a low pressure fuel system for a gaseous fuel engine.

BACKGROUND ART

Large stationary engines used to power pumps, generators and the like are often designed to burn gaseous fuels such as natural gas, butane, propane, methane or other combustibles in a gaseous state. Adequate pressurization of the fuel is necessary for efficient performance of the engine. While some gaseous fuel sources supply gaseous fuel at high pressure, such that introduction of the fuel directly into the intake manifold of the engine is possible, other gaseous fuels are supplied at low pressure. For example, it is known for natural gas suppliers to deliver natural gas at pressures substantially less than the intake manifold pressure of many gaseous fuel engines. If natural gas or other gaseous fuel is supplied at low pressure, the pressure must be raised to a pressure greater than the pressure in the intake manifold, for efficient operation of the gaseous fuel engine.

It is known to use compressors to raise the pressure of a low pressure gaseous fuel, as necessary, to introduce the fuel to the intake manifold. Reciprocating compressors or rotary screw compressors can be used to increase the fuel pressure. However, often, such compressor systems are large and expensive, and may require considerable space for installation and use. Adequate space for a large compressor system, including a screw or rotary compressor and a drive motor, may not be available, readily. Further, operating such compressor systems with independent electric motors can be expensive.

U.S. Pat. No. 5,329,757 discloses a method and system for increasing the pressure of gaseous fuel delivered to the fuel system of a gas turbine engine. Gaseous fuel turbochargers are used to compress the gaseous fuel supplied to the gas turbine engine. Pressurized or compressed air is discharged from a high pressure section of the gas turbine engine, and is communicated to turbines powering a plurality of compressors. Gaseous fuel supplied to the compressors is raised in pressure by the compressors, for subsequent introduction in to the gas turbine engine.

It is known to use turbochargers to provide combustion air to internal combustion engines at higher pressure and density than atmospheric pressure and density. The goal of increasing the gaseous fuel pressure can be achieved using a separate, independent turbocharger system for the gaseous fuel, or by introducing the gaseous fuel with the combustion air at the inlet of the first stage of a single, combined turbocharger system. However, providing a separate, independent gaseous fuel turbocharger, or introducing even low pressure gaseous fuel along with combustion air at the inlet for the first stage of a combined combustion air and gaseous fuel turbocharger requires additional work of the compressor in compressing the fuel.

The present invention is directed to overcoming one or more of the problems as set forth above.

DISCLOSURE OF THE INVENTION

In one aspect of the invention, a fuel system for a gaseous fuel internal combustion engine is provided with a source of compressed gaseous fuel and a turbocharger including a first compressor having a first compressor wheel, a first inlet and a first outlet each associated with the first compressor wheel; and a second compressor having a second compressor wheel, a second inlet and a second outlet each associated with the second compressor wheel. An interstage duct interconnects in fluid flow communication the first outlet of the first compressor wheel with the second inlet of the second compressor wheel. A gaseous fuel conduit is disposed between and interconnects, in fluid flow communication, the source of compressed gaseous fuel and the interstage duct.

Another aspect of the invention is a method of operating a gaseous fuel system for an internal combustion engine, with steps of providing a multi-stage compressor including a first compressor having a first compressor wheel, a first inlet associated with the first compressor wheel, and a first outlet associated with the first compressor wheel; and a second compressor having a second compressor wheel, a second inlet associated with the second compressor wheel, and a second outlet associated with the second compressor wheel; fluidly interconnecting in series the first outlet of the first compressor with the second inlet of the second compressor using an interstage duct; providing a source of low pressure gaseous fuel; and conducting gaseous fuel from the source of low pressure gaseous fuel to the interstage duct.

BRIEF DESCRIPTION OF THE DRAWINGS

FIG. 1 is a partial cross-section of a low pressure gaseous fuel system according to the present invention;

FIG. 2 is a fragmentary partial cross-sectional view similar to that of FIG. 1, but showing a modified form of the present low pressure gaseous fuel system; and FIG. 3 is a schematic representation of the present invention in a turbocharger system different than that shown in FIG. 1 and FIG. 2.

BEST MODE FOR CARRYING OUT THE INVENTION

Referring now to the drawings, and more particularly to FIG. 1, there is shown an embodiment of a low pressure gaseous fuel system 10 according to the present invention. Low pressure gaseous fuel system 10 includes a gaseous fuel supply 12 and a turbocharger 14.

Gaseous fuel supply 12 includes a gaseous fuel source 16 and a gaseous fuel duct or conduit 18 from gaseous fuel source 16 to turbocharger 14. Gaseous fuel source 16 may be a pressurized tank for propane, butane or the like; or gaseous fuel source 16 may be a connection to a natural gas network including a pumping station and the like. Gaseous fuel source 16 may include various pumps, pressure regulators and the like for providing a consistent flow of fuel, at relatively constant pressure. The need for and use of such devices are common to gaseous fuel systems, are known to those skilled in the art, and will not be described in further detail herein.

Conduit 18 establishes fluid flow communication between gaseous fuel source 16 and turbocharger 14. Appropriate valves, regulators and the like may be used with conduit 18.

Turbocharger 14 includes a turbine 20, a first compressor 22 and a second compressor 24. A shaft 26 extends between turbine 20, first compressor 22 and second compressor 24.

Turbine 20 includes a turbine housing 28 defining a turbine inlet 30 and a turbine outlet 32. In known manner, turbine inlet 30 is connected in flow communication with a source of pressurized media which may be the exhaust manifold of the internal combustion engine. Turbine outlet 32 is provided to carry away the pressurized gas having flowed through turbine 20. If turbine inlet 30 is connected to the exhaust manifold of the internal combustion engine, turbine outlet 32 will be connected to the exhaust system of the internal combustion engine.

A turbine wheel 34, carried on shaft 26, is disposed in turbine housing 28. Exhaust gases flowing through turbine 20 flow past turbine wheel 34, between turbine inlet 30 and turbine outlet 32. The flow of gases past turbine wheel 34 cause the turbine wheel to rotate, thereby rotating shaft 26.

First compressor 22 includes a first compressor wheel 40 carried on shaft 26. Second compressor 24 includes a second compressor wheel 42 also carried on shaft 26. A housing 44 is disposed around first compressor wheel 40 and second compressor wheel 42. Housing 44 defines a first inlet 46 and a first outlet 48 associated with first compressor wheel 40. Housing 44 further defines a second inlet 50 and a second outlet 52 associated with second compressor wheel 42. First inlet 46 is in flow communication with an air source, which may be ambient. Second outlet 52 is in flow communication with the internal combustion engine normally at intake manifold 56.

Housing 44 additionally defines an interstage duct 58 between first compressor 22 and second compressor 24. Interstage duct 58 establishes flow communication between first outlet 48 of first compressor 22 and second inlet 50 of second compressor 24. Commonly, first inlet 46 and second inlet 50 are generally axially oriented relative to first compressor wheel 40 and second compressor wheel 42, respectively, and first outlet 48 and second outlet 52 are radially oriented with respect to first compressor wheel 40 and second compressor wheel 42, respectively. Interstage duct 58 is a serpentine conduit between first outlet 48 and second inlet 50.

A first diffuser zone 60 is disposed in interstage duct 58 near first outlet 48 of first compressor 22, and separates an upstream zone 62 in interstage duct 58 from a downstream zone 64 in interstage duct 58. A plurality of deswirling vanes 66 is disposed in interstage duct 58 near second inlet 50 of second compressor 24. A second diffuser zone 68 is disposed near second outlet 52 of second compressor 24. Diffuser zones 60 and 68 are regions of increased flow area, to convert dynamic pressure to static pressure. Diffuser zones 60 and 68 may be vaneless, or may include diffuser vanes, to improve diffusion efficiency and/or to change compressor flow characteristics.

A housing block 70 is provided between turbine 20 and second compressor 24, and includes appropriate bearings 72 and seals 74 for shaft 26 passing therethrough.

Conduit 18 is connected in flow communication to interstage duct 58 in downstream zone 64 of interstage duct 58, between diffuser zone 60 and deswirling vanes 62, and establishes fluid flow communication between gaseous fuel source 16 and interstage duct 58.

In FIG. 2, a modified form of the present invention is shown, in which conduit 18 is connected to interstage duct 58 in the zone or region of interstage duct 58 occupied by diffuser zone 60.

While the present invention thus far has been shown with a turbocharger having two compressor stages on a single shaft operated by a single turbine, it should be understood that the present invention will work equally as well with other forms and constructions of turbochargers, including turbochargers powered by other than an exhaust gas turbine or multi-stage turbochargers having compressor section configurations different from that shown and described previously herein. For example, the present invention can be utilized with a turbocharger having back to back compressor wheels rather than the front to back orientation described herein. Additionally, the present invention can be utilized with a multi-staged turbocharger wherein a first compressor section and a second compressor section are separately powered by a first turbine and a second turbine respectively. Any of the aforementioned turbocharger arrangements can be used advantageously to supply gaseous fuel to an internal combustion engine from a low pressure gaseous source.

One such alternative turbocharger arrangement is shown in FIG. 3. A first turbocharger 80 includes a first turbine 82 powered by exhaust gas from an exhaust line 84. A first shaft 86 interconnects first turbine 82 with a first compressor 88. A second turbocharger 90 includes a second turbine 92 powered by exhaust gas from an exhaust line 94. A second shaft 96 interconnects second turbine 92 with a second compressor 98. An ambient air inlet 100 is provided to first compressor 88, and an interstage duct 102 is provided between first compressor 88 and second compressor 98. Gaseous fuel source 16 and conduit 18 are in flow communication with interstage duct 102 as described in the previous embodiments of the present invention.

Any of the aforedescribed turbocharger arrangements may also include an interstage cooler between the compressor stages, to cool the compressed air between first outlet 48 and second inlet 50. Use of an interstage cooler is known to those skilled in the art and will not be described further herein.

Industrial Applicability

In use, an exhaust gas stream from the exhaust manifold of an internal combustion engine or the like is routed to turbine 20, and flows through turbine inlet 30, past turbine wheel 34 to turbine outlet 32. The exhaust gas flow past turbine wheel 34 causes the turbine wheel to rotate, thereby rotating shaft 26. Through the rotation of shaft 26 by turbine wheel 34, rotational force is thereby provided to first compressor wheel 40 and second compressor wheel 42, each of which also are carried on shaft 26.

Ambient air enters first compressor 22 at first inlet 46, and flows past first compressor wheel 40 to first outlet 48. The velocity and pressure of air flowing past first compressor wheel 40 are increased. As the air flows through first diffuser zone 60, the velocity of the air is decreased and the static pressure of the air is increased. Thus, first diffuser zone 60 establishes and separates a zone of lower static pressure, upstream zone 62, from a zone of higher static pressure, downstream zone 64, in interstage duct 58.

In the embodiment shown in FIG. 1, the low pressure gaseous fuel from gaseous fuel supply 12 is introduced to the compressed air stream in interstage duct 58. The combined flow of air and gaseous fuel flows through deswirling vanes 66 and into second compressor 24, through second inlet 50. In second compressor 24, the combined fluid stream of air and gaseous fuel is further compressed by second compressor wheel 42, and flows through second diffuser zone 68, through second outlet 52 to intake manifold 56 of the internal combustion engine.

It is advantageous to induct the gaseous fuel into interstage duct 58 in a region where the static pressure of the gaseous fuel stream is greater than the static pressure in interstage duct 58. However, it is wasteful to introduce the gaseous fuel stream at first inlet 46 if the static pressure of the gaseous fuel stream is greater than the static pressure coming out of first compressor 22. Depending on the performance of first compressor 22, and first diffuser zone 60, the gaseous fuel may be introduced to interstage duct 58 in downstream zone 64, between first diffuser zone 60 and deswirling vanes 66. However, if the static pressure of the gaseous fuel stream from gaseous fuel source 16 is less than the static pressure of the air stream in downstream zone 64, the gaseous fuel stream can be introduced to interstage duct 58 in a zone of lower static pressure.

FIG. 2 shows a modified embodiment in which the gaseous fuel stream is introduced to interstage duct 58 in first diffuser zone 60. Alternatively, the gaseous fuel stream also can be introduced to interstage duct 58 in upstream zone 62, ahead of first diffuser zone 60.

The present invention can be used to increase the pressure of a low pressure gaseous fuel supply, for introduction into the intake manifold of an internal combustion engine. The low pressure gaseous fuel supply system of the present invention is efficient, and eliminates the need for bulky, expensively operating independent compressor systems for the low pressure fuel. Further, by selecting and controlling the operation of the various compressor stages in a turbo charger, passing the low pressure gaseous fuel stream unnecessarily through the first compressor stage of a multi compressor turbocharger can be eliminated.

Other aspects, objects and advantages of this invention can be obtained from a study of the drawings, the disclosure and the appended claims.

What is claimed is:

1. A fuel system for a gaseous fuel internal combustion engine, comprising:
   a source of compressed gaseous fuel;
   a turbocharger including:
      a first compressor having a first compressor wheel, a first inlet and a first outlet each associated with said first compressor wheel;
      a second compressor having a second compressor wheel, a second inlet and a second outlet each associated with said second compressor wheel; and
      an interstage duct fluidly interconnecting said first outlet of said first compressor with said second inlet of said second compressor, said interstage duct including a diffuser zone disposed in said interstage duct near said first outlet, and a plurality of deswirling vanes disposed in said interstage duct near said second inlet; and
   a gaseous fuel conduit disposed between and interconnected in fluid flow communication with said source of compressed gaseous fuel and said interstage duct, said gaseous fuel conduit being connected in flow communication with said interstage duct between said diffuser zone and said plurality of deswirling vanes.

2. The fuel system of claim 1, including a shaft carrying said first compressor wheel and said second compressor wheel.

3. The fuel system of claim 2, including a turbine having a turbine wheel carried on said shaft.

4. The fuel system of claim 1, including a first shaft carrying said first compressor wheel, a first turbine having a first turbine wheel carried on said first shaft, a second shaft carrying said second compressor wheel, and a second turbine having a second turbine wheel carried on said second shaft.

5. A gaseous fuel internal combustion engine, comprising:
   an intake manifold;
   a source of gaseous fuel;
   a turbocharger including:
      a first compressor having a first compressor wheel, a first inlet associated with said first compressor wheel, and a first outlet associated with said first compressor wheel;
      a second compressor having a second compressor wheel, a second inlet associated with said second compress or wheel, and a second outlet associated with said second compressor wheel, said second outlet being in fluid communication with said intake manifold; and
      an interstage duct interconnected in fluid flow communication with said first outlet of said first compressor and said second inlet of said second compressor, said interstage duct including a diffuser zone disposed in said interstage duct near said first outlet, and a plurality of deswirling vanes disposed in said interstage duct near said second inlet; and
   a gaseous fuel conduit disposed between and interconnected in fluid flow communication with said source of gaseous fuel and said interstage duct, said gaseous fuel conduit being connected in flow communication with said interstage duct between said diffuser zone and said plurality of deswirling vanes.

6. The gaseous fuel internal combustion engine of claim 5, including a shaft carrying said first compressor wheel and said second compressor wheel, and a turbine having a turbine wheel carried on said shaft.

7. The gaseous fuel internal combustion engine of claim 5, including a first shaft carrying said first compressor wheel, a first turbine having a first turbine wheel carried on said first shaft, a second shaft carrying said second compressor wheel, and a second turbine having a second turbine wheel carried on said second shaft.

8. A method of operating a gaseous fuel system for an internal combustion engine, comprising the steps of:
   providing a first compressor including a first compressor wheel, a first inlet associated with the first compressor wheel, and a first outlet associated with the first compressor wheel; and a second compressor including a second compressor wheel, a second inlet associated with the second compressor wheel, and a second outlet associated with the second compressor wheel;
   interconnecting in fluid flow communication the first outlet of the first compressor with the second inlet of the second compressor using an interstage duct;
   providing a diffuser zone in said interstage duct near said first outlet, and a plurality of deswirling vanes in said interstage duct near said second inlet;
   providing a source of gaseous fuel; and
   conducting gaseous fuel from the source of gaseous fuel to the interstage duct and introducing the gaseous fuel to the interstage duct between the diffuser zone and the plurality of deswirling vanes.

9. The method of claim 8, including the steps of providing a driven shaft, and rotating the first compressor wheel and the second compressor wheel with the driven shaft.

10. The method of claim 8, including the step of operating first and second turbines to drive the first and second compressor wheels, respectively.

* * * * *